(12) United States Patent
Wold et al.

(10) Patent No.: US 8,731,582 B2
(45) Date of Patent: May 20, 2014

(54) METHOD AND SYSTEM FOR GENERATING TARGETED CONTENT

(75) Inventors: Robert Wold, Phoenix, AZ (US); Richard W. Rudow, Mesa, AZ (US)

(73) Assignee: Trimble Navigation Limited, Sunnyvale, CA (US)

( * ) Notice: Subject to any disclaimer, the term of this patent is extended or adjusted under 35 U.S.C. 154(b) by 738 days.

(21) Appl. No.: 12/342,020

(22) Filed: Dec. 22, 2008

(65) Prior Publication Data

US 2009/0203387 A1 Aug. 13, 2009

Related U.S. Application Data

(60) Provisional application No. 61/065,070, filed on Feb. 8, 2008.

(51) Int. Cl.
*H04W 24/00* (2009.01)

(52) U.S. Cl.
USPC ......... 455/456.3; 455/456.1; 455/422.1; 705/14.1; 705/14.4; 705/14.49; 705/14.46; 705/14.66

(58) Field of Classification Search
USPC ............ 455/456.1, 456.3, 414.2; 705/14.1, 705/14.4, 14.49, 14.46, 14.66
See application file for complete search history.

(56) References Cited

U.S. PATENT DOCUMENTS

| | | | |
|---|---|---|---|
| 6,647,257 B2 * | 11/2003 | Owensby | 455/414.1 |
| 7,242,491 B2 * | 7/2007 | Nakayasu et al. | 358/1.15 |
| 7,603,233 B2 | 10/2009 | Tashiro | |
| 7,664,488 B2 * | 2/2010 | Zellner et al. | 455/414.1 |
| 7,706,740 B2 | 4/2010 | Collins et al. | |
| 8,588,816 B2 | 11/2013 | Collins | |
| 2003/0023482 A1 * | 1/2003 | Messner et al. | 705/14 |
| 2005/0144049 A1 * | 6/2005 | Kuzunuki et al. | 705/6 |
| 2008/0090513 A1 * | 4/2008 | Collins et al. | 455/3.01 |
| 2008/0091347 A1 * | 4/2008 | Tashiro | 701/210 |
| 2008/0189032 A1 * | 8/2008 | Beadman | 701/208 |
| 2009/0163227 A1 * | 6/2009 | Collins | 455/456.3 |
| 2009/0275347 A1 * | 11/2009 | Creemer | 455/456.3 |
| 2013/0137464 A1 * | 5/2013 | Kramer et al. | 455/456.3 |

FOREIGN PATENT DOCUMENTS

WO WO 2005094109 A1 * 10/2005

* cited by examiner

*Primary Examiner* — Khai M Nguyen

(57) ABSTRACT

In one embodiment of a method for generating targeted content, an indication of a geographic position is received from a mobile electronic device. An instance of targeted content is generated based upon the geographic position of the mobile electronic device.

26 Claims, 12 Drawing Sheets

601

| Name | Mi. | Dir. | |
|---|---|---|---|
| Cache 1 | 0.42 | N | 602 |
| Cache 2 | 4.3 | NE | 603 |
| Cache 3 | 10.7 | E | 604 |
| Coffee | 2.4 | NW | 605 |
| Hamburger | 7.1 | SE | 606 |

FIG. 6A

METHOD AND SYSTEM FOR GENERATING TARGETED CONTENT

RELATED APPLICATIONS

The present application claims priority to U.S. Provisional Application Ser. No. 61/065,070 filed Feb. 8, 2008 titled Method and System for Generating Targeted Content, by Robert Wold and Richard Rodow, which is assigned to the assignee of the present invention, which is incorporated in its entirety herein.

BACKGROUND

Geocaching is an outdoor game in which participants hide containers called caches or geocaches and record the coordinates of the cache using a satellite navigation device such as a Global Positioning System (GPS) receiver. The coordinates are then registered on websites along with clues used to assist in finding the cache. Other participants can access the website and, using the posted coordinates, attempt to find the hidden cache.

Because a wider variety of handheld electronic devices are now equipped with GPS functionality, these devices can be used for geocaching rather than a dedicated GPS receiver.

SUMMARY

In one embodiment of a method for generating targeted content, an indication of a geographic position is received from a mobile electronic device. An instance of targeted content is generated based upon the geographic position of the mobile electronic device.

DESCRIPTION OF EMBODIMENTS

The accompanying drawings, which are incorporated in and form a part of this specification, illustrate and serve to explain the principles of embodiments in conjunction with the description. Unless specifically noted, the drawings referred to in this description should be understood as not being drawn to scale.

FIGS. 6A, 6B, 6C, 6D, 6E, and 6F are example screenshots showing targeted content in accordance with embodiments of the present technology.

Figure 7:
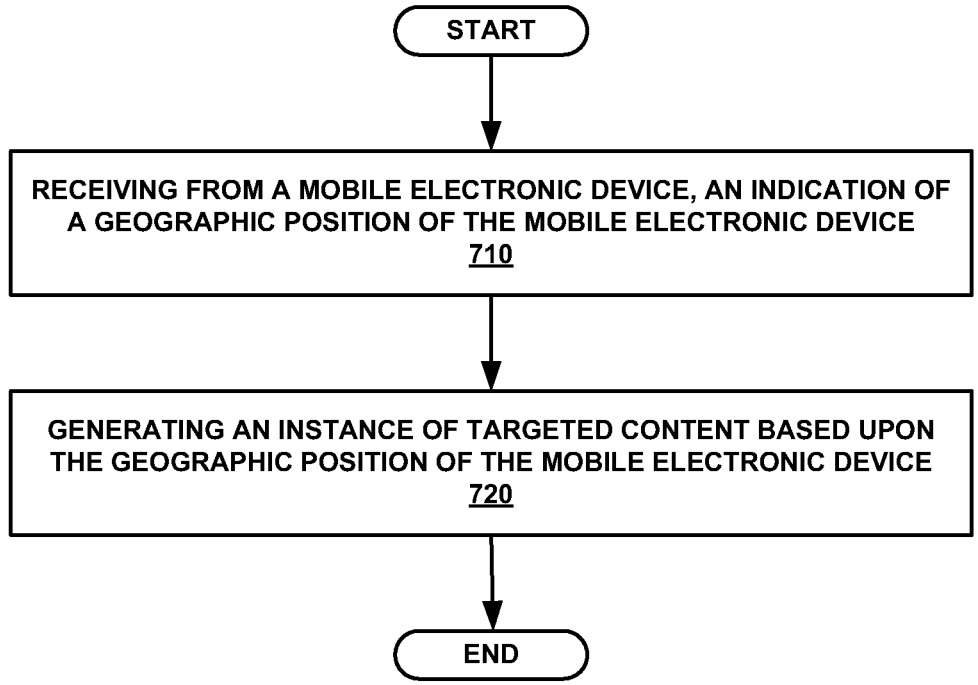

FIG. 7 is a flowchart of a method for generating targeted content in accordance with one embodiment.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. Furthermore, in the following description, numerous specific details are set forth in order to provide a thorough understanding of the subject matter. In other instances, well-known methods, procedures, objects, and circuits have not been described in detail as not to unnecessarily obscure aspects of the subject matter.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing terms such as "receiving," "generating," "utilizing," "selecting," "conveying," "generating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
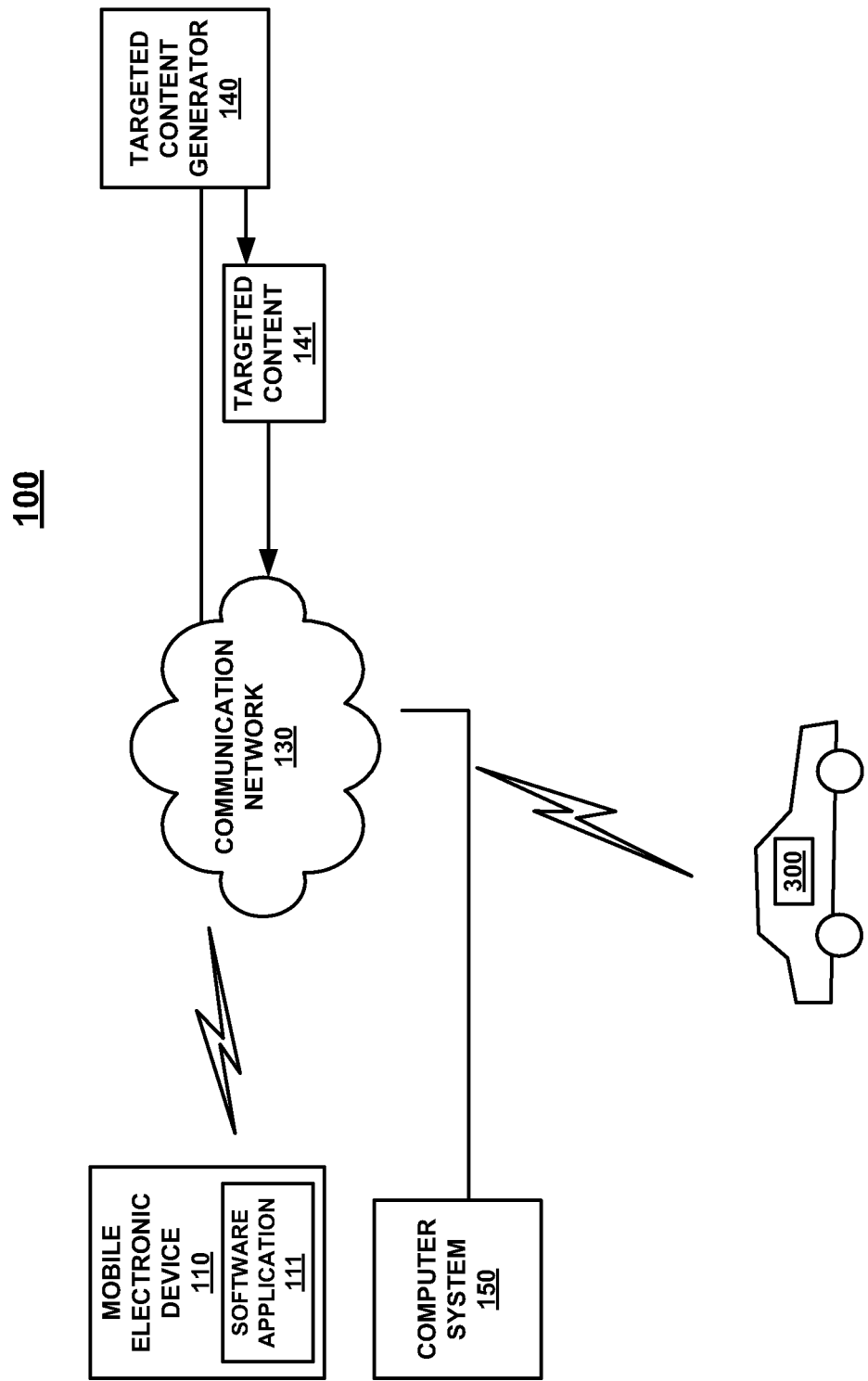
FIG. 1 shows components used in a system for generating targeted content in accordance with one embodiment.

With reference to FIG. 1, embodiments of the present technology comprise a mobile electronic device 110 which is communicatively coupled with a targeted content generator 140 via a communication network 130. In embodiments of the present technology, mobile electronic device 110 comprises a handheld electronic device such as a cellular telephone, personal digital assistant (PDA), laptop computer, or the like. In one embodiment, the mobile electronic device comprises a vehicle navigation system 300 disposed within a car, truck, or other vehicle. In the following discussion, reference will be made to mobile electronic device 110. However, unless specifically noted, it will be assumed that the references to mobile electronic device 110 are also applicable to vehicle navigation system 300 as well. As will be discussed in greater detail below, mobile electronic device 110 is configured to determine its geographic position. For the purpose of the present invention, the term "geographic position" refers to a set of coordinates in at least two dimensions (e.g., latitude and longitude) describing a horizontal position of mobile electronic device 110 on the Earth's surface. Additionally, the geographic position of mobile electronic device 110 can include its elevation above a defined datum such as mean sea level. As will be discussed in greater detail below, a software application 111 resident upon mobile electronic device 110 interacts with targeted content generator 140 and facilitates the selection of targeted content 141 which is generated based upon a geographic position of mobile electronic device 110. For the purpose of the present invention, the term "targeted content" refers to messages, advertising, promotional offers, coupons, or the like which have been selected at least in part based upon a geographic position of mobile electronic device 110.

In one embodiment, communication network 130 comprises a wireless communication network such as a cellular telephone network, or wireless LAN. In other instances, communication network may comprise a wired network such as a LAN, MAN, WAN, or combination of wired and wireless network.

Targeted content generator 140 is configured to receive the geographic position of mobile electronic device 110 and to automatically generate an instance of targeted content 141 based upon that geographic position. It is noted that the geographic position used by targeted content generator 140 may be the current geographic position of mobile electronic device 110, a set of one or more past geographic positions of mobile electronic device 110, or a predicted geographic position of mobile electronic device 110. The generation of an instance of targeted content 141 is a dynamic process in that, as mobile electronic device 110 is moved, new instances of targeted content 141 can be selected and sent based upon the new geographic position of mobile electronic device 110. Additionally, the generation of instances of targeted content 141 does not require the input of a user of mobile electronic device 110. For example, many conventional navigation systems rely upon a database of points of interest. A user typically has to initiate a search to find a desired service based upon user input search criteria. In contrast, one embodiment of the present technology is configured to automatically send an instance of targeted content 141 to mobile electronic device 110 based upon the geographic position of a store or outlet of a subscribed advertiser and its proximity to mobile electronic device 110. As mobile electronic device 110 is moved, some instances of targeted content 141 will no longer be sent to the device. Additionally, new instances of targeted content 141 will be sent from targeted content generator 140 based upon a new geographic position of mobile electronic device 110.

In one embodiment of the present technology, an advertiser subscribes with targeted content generator 140. More specifically, the advertiser provides the geographic position of stores, outlets, or other locations with which the advertiser is associated. In one embodiment, the advertiser provides the boundaries of a region in which the advertiser provides a service, or sells a product. When a mobile electronic device 110 sends a geographic position that is proximate to a store, an outlet, or location of the subscribed advertiser, targeted content generator 140 generates an instance of targeted content 141. In one embodiment, the instance of targeted content 141 is sent from targeted content generator 140 to mobile electronic device 110 via communication network 130. In another embodiment, a user can utilize a computer system 150 (e.g., a personal computer) to access targeted content via communication network 130.

In one embodiment, the instance of targeted content 141 comprises a name of the store, outlet, service, or location of the subscribed advertiser and a geographic position, or region, of that location. In one embodiment, the geographic position of the subscribed advertiser comprises an address of the store, outlet, or location that is proximate to mobile electronic device 110. In one embodiment, the instance of targeted content 141 comprises a set of instructions which describe how to get from the current geographic position of mobile electronic device 110 to the location of the subscribed advertiser. In another embodiment, the instance of targeted content 141 comprises a set of instructions which describe how to get from a previous geographic position of mobile electronic device 110 to the location of the subscribed advertiser. In another embodiment, the instance of targeted content 141 comprises a set of instructions which describe how to get from a predicted geographic position of mobile electronic device 110 to the location of the subscribed advertiser. In one embodiment, the instance of targeted content 141 may also comprise an electronic coupon, or promotional code, issued by the subscribed advertiser.

In one embodiment, the selection of targeted content 141 may also be based upon the geographic position of mobile electronic device 110 and the current time. Thus, targeted content generator 140 can modify the selection of targeted content 141 to provide targeted content that is more appropriate for the current time. In one embodiment, the selection of an instance of targeted content 141 may also be based upon a historical record of a user of mobile electronic device 110 having previously selected an instance of targeted content from the subscribed advertiser. In other words, if a user of mobile electronic device 110 has previously expressed an interest in a particular subscribed advertiser, targeted content generator 140 may give greater priority to that subscribed advertiser when generating instances of targeted content 141 in the future.

Figure 2:
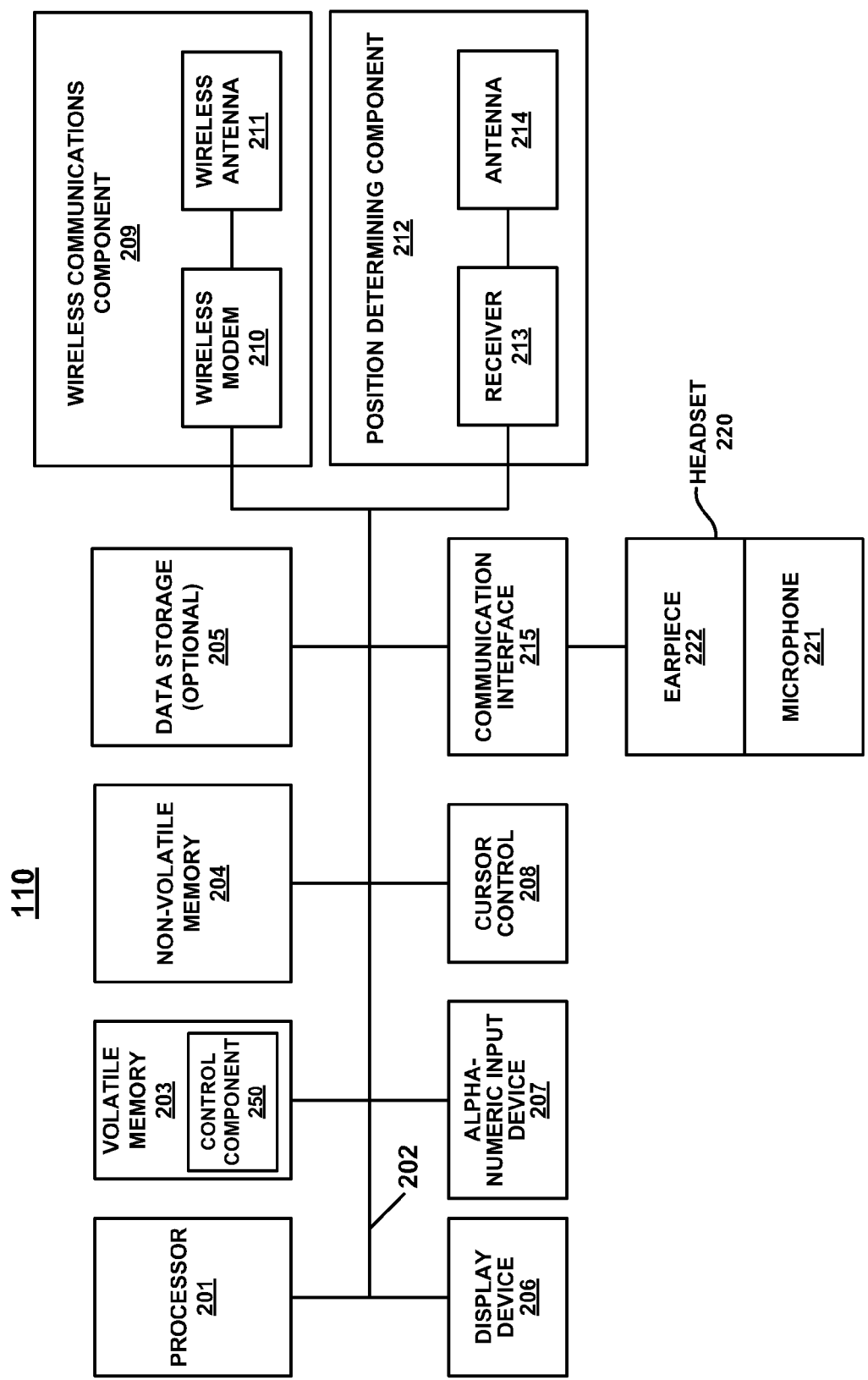
FIG. 2 is a block diagram of a mobile electronic device utilized in accordance with one embodiment.

With reference to FIG. 2, portions of the present technology are comprised of executable instructions that reside, for example, in volatile memory 203 of mobile electronic device 110. In FIG. 2, mobile electronic device 110 comprises a processor 201 coupled with an address/data bus 202. Processor 201 is for processing digital information and instructions and bus 202 is for conveying digital information between various components of mobile electronic device 110. Also coupled with bus 202 is volatile memory (e.g., RAM) 203 for storing the digital information and instructions of a more volatile nature and a non-volatile memory (e.g., ROM) 204 for storing information and instructions of a more permanent nature. In addition, mobile electronic device 110 may optionally include a data storage device 205 for storing vast amounts of data. In embodiments of the present technology, data storage device 205 may comprise a magnetic data storage device, or optical data storage device. It should be noted that instructions for processor 201 can be stored in non-volatile memory 204, volatile memory 203, or data storage device 205.

Returning still to FIG. 2, mobile electronic device 110 further comprises a display device 206, and an alpha-numeric input device 207 (e.g., a keyboard, or keypad), and a cursor control device 208 (e.g., trackball, touchpad, joystick, etc.) for inputting data, selections, updates, etc. In one embodiment, display device 206 may comprise a touch screen assembly which displays an alpha-numeric interface which can be used to implement a "soft-key" functionality. Alternatively, it will be appreciated that a cursor can be directed and/or activated via input from alpha-numeric input device 207 using special keys and key sequence commands.

Returning to FIG. 2, mobile electronic device 110 further comprises a wireless communications component 209, comprising a wireless modem 210 and a wireless antenna 211, coupled with bus 202. An optional GNSS position determining component 212, comprising a GNSS receiver 213 and a GNSS antenna 214, is also coupled with bus 202.

Wireless communications component 209 is for transmitting and receiving wireless messages (e.g., data and/or commands). In one embodiment, wireless communications component 209 comprises a cellular wireless antenna 211 and a cellular wireless modem 210. In one embodiment, mobile electronic device 110 sends and receives message using the Short Message Service (SMS). However, mobile electronic device 110 is well suited to utilize other message formats as well such as the Global System for Mobile Communications (GSM) specification, the Enhanced Data rated for GMS Evolution (EDGE) variant of the GSM specification, or the Global Packet Radio Service (GPRS) specification. In one embodiment, wireless communications component 209 is compliant with a Code Division Multiple Access (CDMA) communication standard, or a variant thereof. Variants of the CDMA standard include, but are not limited to the CDMA-2000 standard, the WCDMA standard, the HSPDA standard, the TD-CDMA standard, and the cdmaOne standard. In another embodiment, wireless communications component 209 is compliant with the Time Division Multiple Access (TDMA) standard. In another embodiment, wireless communications component 209 is compliant with the Integrated Digital Enhanced Network (iDEN) specification. Additionally, an embodiment of the present technology is well suited to implement potential 4G networks such as the Worldwide Interoperability for Microwave Access (WiMax) technology and the 3rd Generation Partnership Project (3GPP) Long Term Evolution (LTE) technology.

GNSS position determining system 212 is for determining the location of mobile electronic device 110. In FIG. 2, position determining component 212 comprises a GNSS antenna 214 and a GNSS receiver 213. GNSS refers to a number of satellite navigation systems that provide global geo-spatial positioning data which permits electronic devices to determine their geographic position (e.g., latitude, longitude, and altitude) with great precision. Satellite systems included in the GNSS include, but are not limited to, the Global Positioning System (GPS), GLONASS, Beidou, and IRNSS navigation systems which are, or are soon to be, implemented. However, mobile electronic device 110 is not limited to using a GNSS position determining system alone. For example, position determining component 212 may determine the location of mobile electronic device 110 using cellular telephone signals, digital television signals, terrestrial-based navigation systems, inertial navigation systems, etc.

In FIG. 2, mobile electronic device 110 further comprises a communication interface 215 which is coupled with bus 202. In one embodiment, communication interface 215 is communicatively coupled with a headset 220 comprising a microphone 221 and an earpiece 222. In one embodiment, headset 220 is communicatively coupled with communication interface 215 via a wireless communication system such as the Bluetooth® system. In another embodiment, headset 220 is coupled with communication interface 215 via a wired connection.

Also shown in FIG. 2 is a control component 250 disposed within volatile memory 203. In embodiments of the present technology, control component 250 comprises software instructions of software application 111 which cause mobile electronic device 110 to automatically send its geographic position to targeted content generator 140. However, it is noted that control component 250 can be implemented as dedicated hardware and/or firmware components, or a combination thereof in one embodiment.

Figure 3:
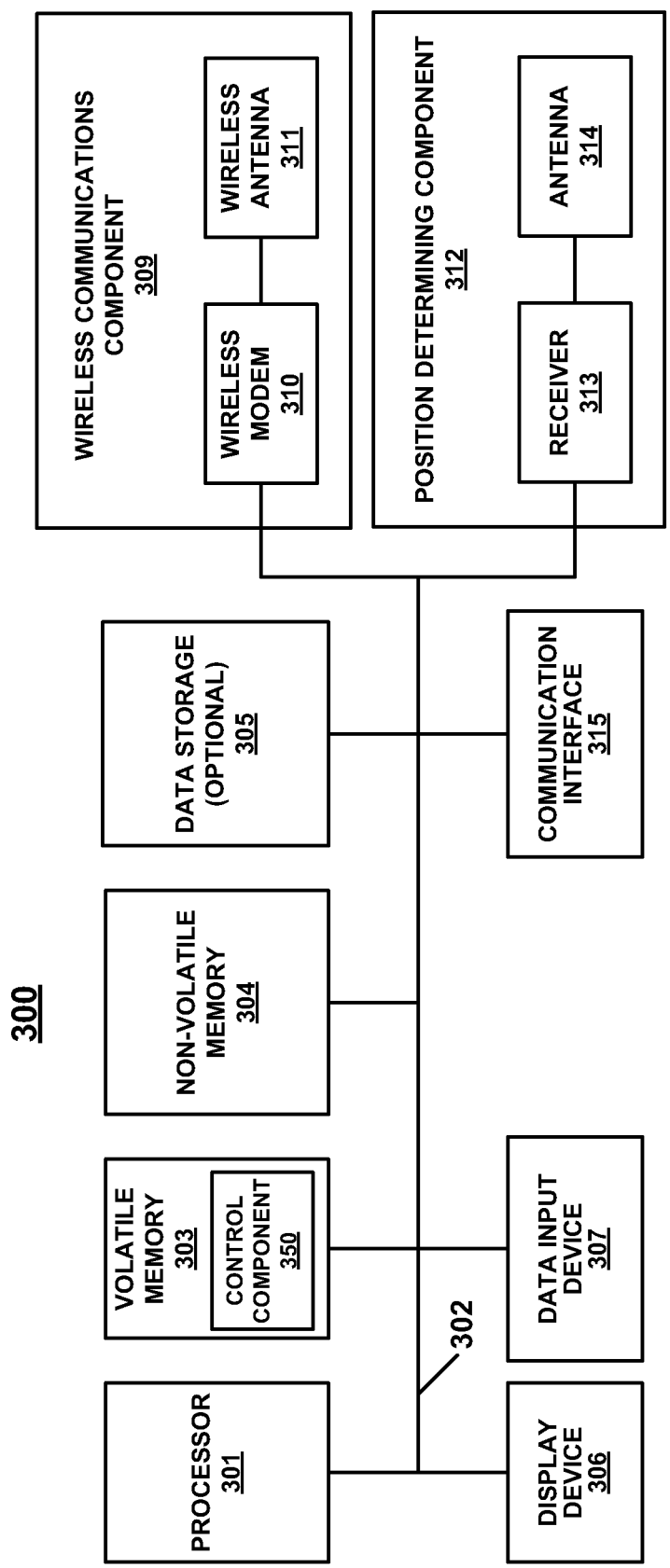
FIG. 3 is a block diagram of a mobile electronic device utilized in accordance with one embodiment.

With reference to FIG. 3, portions of the present technology are comprised of executable instructions that reside, for example, in volatile memory 303 of mobile electronic device 300. In FIG. 3, mobile electronic device 300 comprises a processor 301 coupled with an address/data bus 302. Processor 301 is for processing digital information and instructions and bus 302 is for conveying digital information between various components of mobile electronic device 300. Also coupled with bus 302 is volatile memory (e.g., RAM) 303 for storing the digital information and instructions of a more volatile nature and a non-volatile memory (e.g., ROM) 304 for storing information and instructions of a more permanent nature. In addition, mobile electronic device 300 may optionally include a data storage device 305 for storing vast amounts of data. In embodiments of the present technology, data storage device 305 may comprise a magnetic data storage device, or optical data storage device. It should be noted that instructions for processor 301 can be stored in non-volatile memory 304, volatile memory 303, or data storage device 305.

Returning still to FIG. 3, mobile electronic device 300 further comprises a display device 306, and a data input device 307 for inputting data, selections, updates, etc. In one embodiment, display device 306 may display an alpha-numeric interface which can be used to implement a "soft-key" functionality.

Returning to FIG. 3, mobile electronic device 300 further comprises a wireless communications component 309, comprising a wireless modem 310 and a wireless antenna 311, coupled with bus 302. An optional GNSS position determining component 312, comprising a GNSS receiver 313 and a GNSS antenna 314, is also coupled with bus 302.

Wireless communications component 309 is for transmitting and receiving wireless messages (e.g., data and/or commands). In one embodiment, wireless communications component 309 comprises a cellular wireless antenna 311 and a cellular wireless modem 310. In one embodiment, mobile electronic device 300 sends and receives message using the Short Message Service (SMS). However, mobile electronic device 300 is well suited to utilize other message formats as well such as the Global System for Mobile Communications (GSM) specification, or the Global Packet Radio Service (GPRS) specification. In another embodiment, wireless communications component 309 comprises a radio transceiver. In one embodiment, wireless communications component 309 is compliant with a Code Division Multiple Access (CDMA) communication standard, or a variant thereof. Variants of the CDMA standard include, but are not limited to the CDMA-2000 standard, the WCDMA standard, the HSPDA standard, the TD-CDMA standard, and the cdmaOne standard. In another embodiment, wireless communications component 309 is compliant with the Time Division Multiple Access (TDMA) standard. In another embodiment, wireless communications component 309 is compliant with the Integrated Digital Enhanced Network (iDEN) specification. Additionally, an embodiment of the present technology is well suited to implement potential 4G networks such as the Worldwide Interoperability for Microwave Access (WiMax) technology and the 3rd Generation Partnership Project (3GPP) Long Term Evolution (LTE) technology. It is noted that wireless communications component 309 may also implement other communication systems such as satellite communication systems, radio frequency communication systems, and the like in other embodiments.

GNSS position determining system 312 is for determining the location of mobile electronic device 300. In FIG. 3, position determining component 312 comprises a GNSS antenna 314 and a GNSS receiver 313. GNSS refers to a number of satellite navigation systems that provide global geo-spatial positioning data which permits electronic devices to determine their geographic position (e.g., latitude, longitude, and altitude) with great precision. Satellite systems included in the GNSS include, but are not limited to, the Global Positioning System (GPS), GLONASS, Beidou, and IRNSS navigation systems which are, or are soon to be, implemented. However, mobile electronic device 300 is not limited to using a GNSS position determining system alone. For example, position determining component 312 may determine the location of mobile electronic device 300 using cellular telephone signals, digital television signals, terrestrial-based navigation systems, inertial navigation systems, etc.

In FIG. 3, mobile electronic device 300 further comprises a communication interface 315 which is coupled with bus 302. In one embodiment, communication interface 315 is communicatively coupled with a speaker (not shown) such that mobile electronic device 300 can generate audio commands to a vehicle operator.

Also shown in FIG. 3 is a control component 350 disposed within volatile memory 303. In embodiments of the present technology, control component 350 comprises software instructions which cause mobile electronic device 300 to automatically send its geographic position to said targeted content generator 140. However, it is noted that control component 350 can be implemented as dedicated hardware and/or firmware components, or a combination thereof in one embodiment.

Figure 4:
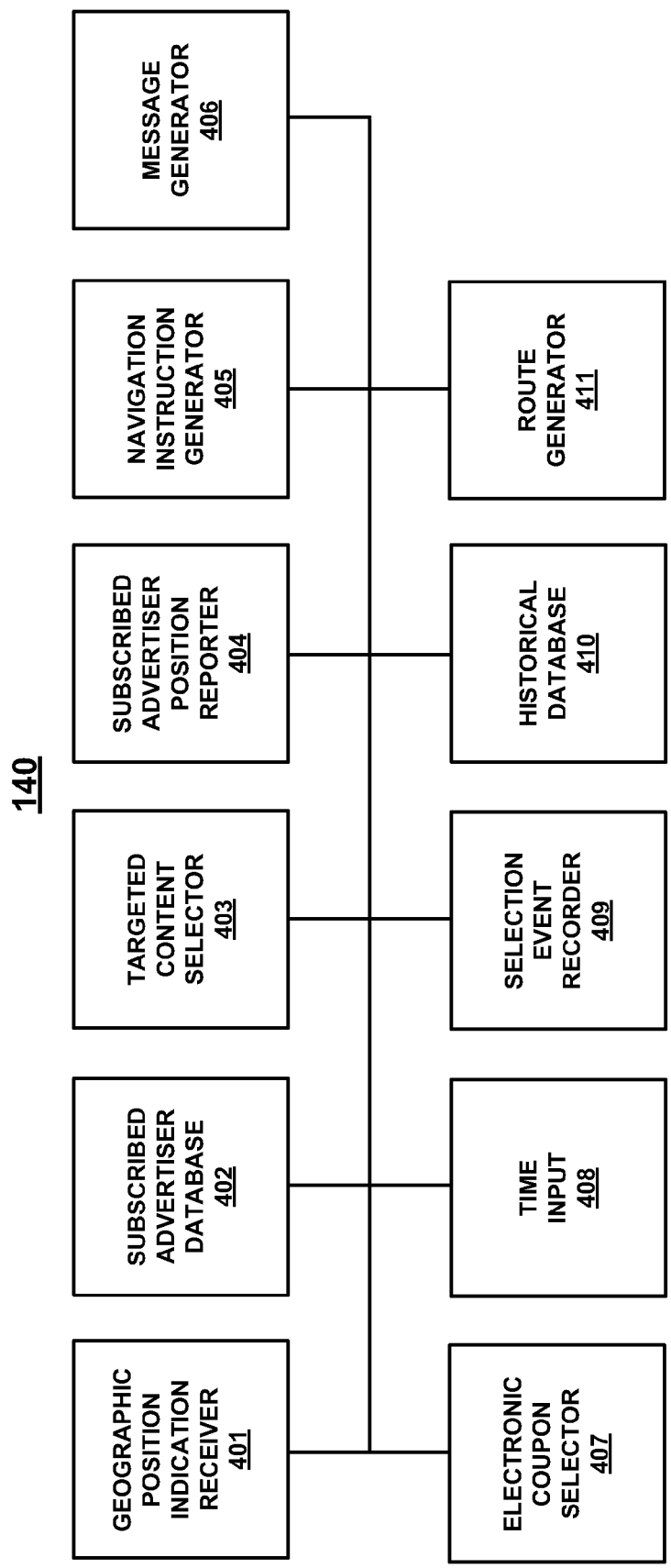
FIG. 4 is a block diagram of a targeted content generator in accordance with one embodiment.

FIG. 4 is a block diagram of a targeted content generator 140 in accordance with an embodiment of the present technology. It is noted that components described below with reference to targeted content generator 140 may comprise software, firmware, or hardware components disposed upon mobile electronic device 110 in one embodiment of the present technology. In FIG. 4, targeted content generator 140 comprises a geographic position indication receiver 401. Geographic position indication receiver 401 is configured for receiving an indication of the geographic position of a mobile electronic device (e.g., 110). In one embodiment, a mobile electronic device such as 110 generates a message conveying its current geographic position (e.g., latitude and longitude). Geographic position indication receiver 401 then accesses the current geographic position data from the message sent from mobile electronic device 110. In another embodiment, geographic position indication receiver 401 accesses a set of previous geographic positions of mobile electronic device 110 from historical database 410 as will be described in greater detail below. In another embodiment, geographic position indication receiver 401 accesses a predicted geographic position of mobile electronic device 110 from route generator 411 as will be described in greater detail below.

Targeted content generator 140 further comprises a subscribed advertiser database 402. In one embodiment, advertisers subscribe to the service provided by targeted content generator 140. In one embodiment, each store or outlet of a subscribed advertiser is also listed in subscribed advertiser database 402. More specifically, the geographic position of each store, or outlet, of a subscribed advertiser is stored in subscribed advertiser database 402. It is noted that the geographic position of a store or outlet may be formatted as a latitude and longitude of a location, an address of a location, the boundaries of a region, or may be represented in another format which permits conveying the location of the store or outlet.

Targeted content generator 140 further comprises a targeted content selector 403. In one embodiment, targeted content selector 403 is configured for comparing the geographic position of mobile electronic device 110 received from geographic position indication receiver 401 with at least one geographic position of a subscribed advertiser accessed via subscribed advertiser database 402. In one embodiment, targeted content selector 403 indicates which subscribed advertiser locations are within a threshold distance from the geographic position of mobile electronic device 110. For example, a threshold distance could be set to 20 miles from the geographic position of mobile electronic device 110. Thus, stores or outlets of subscribed advertisers within a 20 mile radius of the geographic position of mobile electronic device 110 will be selected by targeted content selector 403. In one embodiment, targeted content selector 403 sends a list of subscribed advertisers which are within the threshold distance from mobile electronic device 110 to subscribed advertiser position reporter 404.

Targeted content generator 140 further comprises a subscribed advertiser position reporter 404. In one embodiment, subscribed advertiser position reporter 404 is configured for providing the geographic position of a store or outlet of a subscribed advertiser which has been identified by targeted content selector. In one embodiment, subscribed advertiser position reporter 404 receives the geographic position data of subscribed advertisers from subscribed advertiser database 402. For example, if a fast food chain has 3 outlets within a 20 mile radius of the geographic position of mobile electronic device 110, subscribed advertiser position reporter 404 provides the geographic position of those 3 outlets to message generator 406. In one embodiment, the geographic position of an outlet is not sent from targeted content generator 140 until an indication of the selection of one of the outlets is received. For example, a list of the outlets may be sent from targeted content generator 140 to mobile electronic device 110. When a user selects one of the outlets in the list, an indication of the selection is sent to targeted content generator 140. In response to the selection, subscribed advertiser position reporter 404 sends the geographic position of the selected outlet to message generator 406 which then conveys the geographic position of the outlet to mobile electronic device 110.

Targeted content generator 140 further comprises a navigation instruction generator 405. In one embodiment, navigation instruction generator 405 is configured for providing instructions for navigating from the geographic position of mobile electronic device 110 to a store or outlet of a subscribed advertiser. In one embodiment, the instructions comprise driving instructions. In one embodiment, a separate set of instructions is generated for each store or outlet within the threshold distance from the geographic position of mobile electronic device 110. Using the above example, a separate set of instructions is generated for navigating from the geographic position of mobile electronic device 110 to each of the 3 outlets of the fast food chain. In one embodiment, the navigation instructions are not generated and/or sent from targeted content generator 140 until an indication of the selection of one of the outlets is received. For example, a list of the outlets may be sent from targeted content generator 140 to mobile electronic device 110. When a user selects one of the outlets in the list, an indication of the selection is sent to targeted content generator 140. In response to the selection, navigation instruction generator 405 sends the navigation instructions for navigating from the geographic position of mobile electronic device 110 to the selected outlet to message generator 406 which then conveys the navigation instructions to mobile electronic device 110.

Targeted content generator 140 further comprises a message generator 406. Message generator 406 is configured for generating messages to mobile electronic device 110. For example, message generator 406 can generate one instance of targeted content 141 which comprises a list of the stores or outlets of subscribed advertisers that are within the threshold distance from the geographic position of mobile electronic device 110. Message generator 406 can also generate an instance of targeted content 141 which conveys the geographic position of the stores or outlets of subscribed advertisers that are within the threshold distance from the geographic position of mobile electronic device 110. Message generator 406 can also generate an instance of targeted content 141 which conveys the navigation instructions for navigating from the geographic position of mobile electronic device 110 to a store or outlet of a subscribed advertiser.

Message generator 406 also generates an instance of targeted content 141 which conveys an electronic coupon to mobile electronic device 110 in one embodiment.

Targeted content generator 140 further comprises an electronic coupon selector 407. In one embodiment, subscribed advertisers may also store authorize targeted content generator 140 to generate an electronic coupon to a user of mobile electronic device 110. In one embodiment, the electronic coupon may comprise a promotional code which is sent via message generator 406 to mobile electronic device 110. When a user of mobile electronic device 110 selects a particular outlet of a subscribed advertiser, electronic coupon selector 407 determines whether an electronic coupon or promotional code is associated with that outlet. If an electronic coupon is associated with that outlet, electronic coupon selector 407 conveys that information to message generator 406 which then sends a message comprising the electronic coupon to mobile electronic device 110. The user of mobile electronic device 110 can then show the electronic coupon displayed on mobile electronic device 110 (e.g., on display device 206 of FIG. 2) to an employee of the subscribed advertiser to receive a discount, or promotional offer. It is noted that the selection of an electronic coupon or promotional code may be based upon a larger geographic region than a particular outlet of a subscribed advertiser. In one embodiment, the list of electronic coupons and/or promotional codes is stored in subscribed advertiser database 402. In one embodiment, the list of electronic coupons and/or promotional codes is stored in electronic coupon selector 407.

Targeted content generator 140 further comprises a time input 408. In one embodiment, the selection of a subscribed advertiser may also be influenced by the time of day. For example, a coffeehouse chain may wish to limit the generating of an instance of targeted content 141 to mornings only. Alternatively, the coffeehouse chain may wish to limit the generating of an instance of targeted content 141 to weekends. In another example, a subscribed advertiser may wish to limit the generating of an instance of targeted content to a particular season such as a spring sale, or the Christmas season. Thus, in one embodiment, targeted content selector 403 accesses the current user time from time input 408 in order to determine which instances of targeted content 141 to select.

Targeted content generator 140 further comprises a selection event recorder 409. In one embodiment, targeted content generator 140 is configured for recording each time a user selects an instance of targeted content 141. For example, when a user of mobile electronic device 110 selects one of the subscribed advertisers displayed, software application will automatically send an indication of the selection event to targeted content generator 140. In one embodiment, selection event recorder 409 records this selection event and stores this information. Thus, targeted content generator 140 can build up a profile of subscribed advertisers in which a user of mobile electronic device 110 is interested. This information may be used to determine whether a subscribed advertiser is considered relevant to that user. Thus, targeted content generator 140 may construct a demographic profile which is associated with a particular mobile electronic device (e.g., 110) and use that information in the selection of an instance of targeted content 141. In one embodiment, the demographic profile is associated with a user account, or user profile, of a registered user of mobile electronic device 110. As an example, targeted content generator 140 may determine that a user of mobile electronic device 110 only selects a coffeehouse chain outlet on Saturday mornings between 8 AM and 10 AM. Thus, in one embodiment targeted content generator 140 will not send an instance of targeted content to mobile electronic device 110 for that subscribed advertiser except in that time period. In so doing, targeted content generator 140 is configured to determine which instances of targeted content 141 are relevant to a particular user and not waste advertising space for products or services that a user is not likely to enjoy. Again, the selection of an instance of targeted content 141 can be related to time of day, location, user preference, types of goods and services, brand names, and activities in which a user has demonstrated an interest. In one embodiment, targeted content generator 140 also uses data for other similar users in determining instances of targeted content. For example, if a user profile shows that the user is interested in bookstores, targeted content generator 140 can access the user profiles of other users who have shown an interest in bookstores. Targeted content generator 140 can then select targeted content of other products and services (e.g., music stores, cafes, etc.) in which the other users have shown an interest. In other words, it may be assumed that users who have shown an interest in one particular product or service may also share an interest in other products or services.

Targeted content generator 140 further comprises a historical database 410. In one embodiment, historical database 410 is configured for recording the received geographic positions of mobile electronic device 110. As will be described below, in some instances a user may not wish to view targeted content 141 while using mobile electronic device 110. For example, this may cause an unwanted distraction for the user. In one embodiment, historical database stores at least one prior geographic position of mobile electronic device 110. In one embodiment, geographic position indication receiver 401 accesses historical database 410 and selects at least one prior geographic position of mobile electronic device 110 to assist in selecting an instance of targeted content 141. In one embodiment, rather than send the instance of targeted content directly to mobile electronic device 110, message generator 406 is configured to convey the instance of targeted content 141 via, for example, the Internet. Thus, a user of mobile electronic device 110 can access targeted content 141 using computer system 150.

Targeted content generator 140 further comprises a route generator 411. In one embodiment, targeted content generator 140 is used in conjunction with, or as a component of, a navigation system. For example, many handheld electronic devices and automobiles are now equipped with navigation systems which facilitate route planning, navigation, and finding services. In one embodiment, route generator 411 is used to plan a route from a geographic position of mobile electronic device 110, to a second geographic position. In so doing, route generator 411 generates a set of predicted geographic positions along the planned route for mobile electronic device 110. In one embodiment, geographic position indication receiver 401 accesses at least one predicted geographic position for mobile electronic device 110 to assist in selecting an instance of targeted content 141. Thus, while a user of mobile electronic device 110 is following the route generated by route generator 411, targeted content generator 140 can convey instances of targeted content 141 to mobile electronic device 110 along the way. Again, this is a dynamic process which does not necessitate user input in order to select and convey an instance of targeted content 141. Furthermore, as described above one embodiment of the present technology is configured for selecting an instance of targeted content 141 based upon previous user behavior. Thus, targeted content generator 141 can limit the instances of targeted content 141 to those considered most relevant for that user.

Example of Generating Targeted Content

The following discussion sets forth in detail the operation of some example systems, devices, and methods of operation of embodiments described herein. However, it is not meant to limit embodiments of the present technology to the described details alone. In the following discussion, mobile electronic device 110 will be referred to as a cellular telephone. However, this is not meant to limit the following description to cellular telephones alone.

Due to the reduction in size of geographic positioning devices, they are increasingly being incorporated into handheld electronic devices. Thus, many cellular telephones now incorporate a GPS device to assist in providing geospatial information. Additionally, the increased processing capabilities of cellular telephones have led to the use of a variety of software applications which effectively convert cellular telephones into handheld computer systems. These software applications include utility and recreational applications. One recreational activity which users of GPS equipped cellular telephones have recently adopted is geocaching in which participants hide artifacts and record the GPS coordinates of the cached artifact. The participants publish the coordinates on a website so that other participants can use their GPS equipped device to find the artifact. In one embodiment, a user of mobile electronic device 110 enters an area, accesses the website, and downloads a list of the caches hidden in the vicinity. This may include sending the geographic position of mobile electronic device 110 to a geocache server in order to determine which caches are proximate to mobile electronic device 110. A user then scrolls through the list of caches and selects one of interest. The geocache software then accesses information about the selected cache including maps, verbal descriptions, and other information for the user of mobile electronic device 110 which facilitate finding the selected cache. Often, a GPS equipped cellular telephone running a geocaching software application is used by geocaching participants. One example of a geocache software application is the Geocache Navigator™ which is commercially available from Trimble® Navigation of Sunnyvale, Calif., 94085.

In one embodiment, software application 111 of FIG. 1 comprises a geocaching software application operating on mobile electronic device 110. In one embodiment, software application 111 implements control component 250 of FIG. 2 which is configured for automatically generating a message comprising the geographic position of mobile electronic device 110 to targeted content generator 140. When a user requests a list of geocaches in the vicinity of mobile electronic device 110, the geographic position of mobile electronic device 110 is sent as well.

In one embodiment of the present technology, in addition to a list of geocaches in the vicinity of mobile electronic device 110, at least one instance of targeted content is sent by targeted content generator 140. For example, in addition to the list of geocaches in the vicinity of mobile electronic device 110, at least one subscribed advertiser is also listed and displayed on mobile electronic device 110. As described above, the subscribed advertiser may be a store, service region, or outlet of a subscribed advertiser. Thus, if a fast food chain is a subscribed advertiser of targeted content generator 140, the outlets of the fast food chain which are in the vicinity of mobile electronic device 110 will be displayed. Again, the selection of which outlets will be displayed on mobile electronic device 110 is based upon determining which outlets of a subscribed advertiser are within a threshold distance of mobile electronic device 110. When a user selects one of the displayed subscribed advertisers, additional information is presented such as the address of the outlet, a map showing the relative locations of the outlet and mobile electronic device 110, and/or instructions for navigating from the geographic position of mobile electronic device 110 to the selected outlet of the subscribed advertiser.

As described above, targeted content generator 140 utilizes the geographic position of mobile electronic device 110 to select an instance of targeted content 141. Thus, when a user of mobile electronic device 110 uses software application 111 to retrieve a list of caches in the vicinity of mobile electronic device 110, targeted content generator 140 uses the geographic position of mobile electronic device 110 to select targeted content 141. Referring now to FIG. 6A, in addition to a list of caches (e.g., 602, 603, and 604 of FIG. 6A) in the vicinity of mobile electronic device 110, at least one instance of targeted content 141 is sent to mobile electronic device 110 as well. Thus, a listing of subscribed advertisers (e.g., 605 and 606 of FIG. 6A), or outlets thereof, which are also in the vicinity of mobile electronic device 110 are displayed.

Figure 6B:
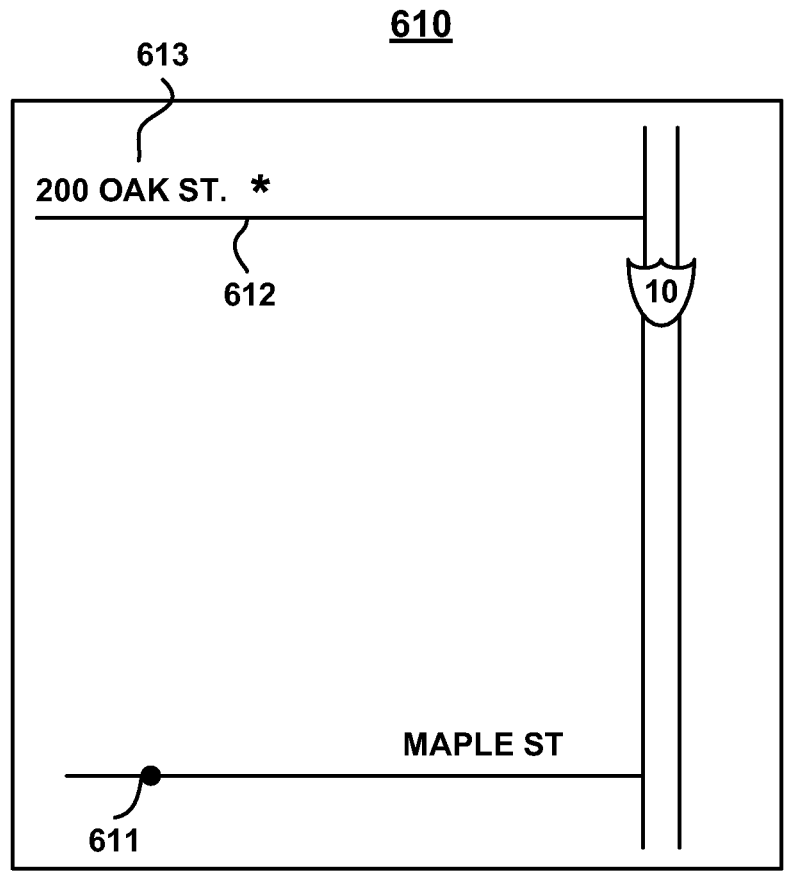

A user can then select one of the subscribed advertisers listed in order to get more information. For example, a user may have selected subscribed advertiser 605 from screenshot 601 of FIG. 6A. In response to the user selecting subscribed advertiser 605, targeted content generator 140 will automatically generate additional information such as a map (e.g., 610 of FIG. 6B). As shown in FIG. 6B, map 610 shows the current geographic position 611 of mobile electronic device 110. Map 610 also shows the geographic position 612 of the subscribed advertiser selected from listing 605 of FIG. 6A. Map 610 also displays an address 613 of the subscribed advertiser selected from cache list 601. While not shown in FIG. 6B, it is noted that targeted content generator 140 may provide additional navigation information as well such as a highlighted route which is recommended to navigate from geographic position 611 to geographic position 612. In one embodiment, navigation information may comprise text or audible information to facilitate navigating from geographic position 611 to geographic position 612.

Figure 6C:
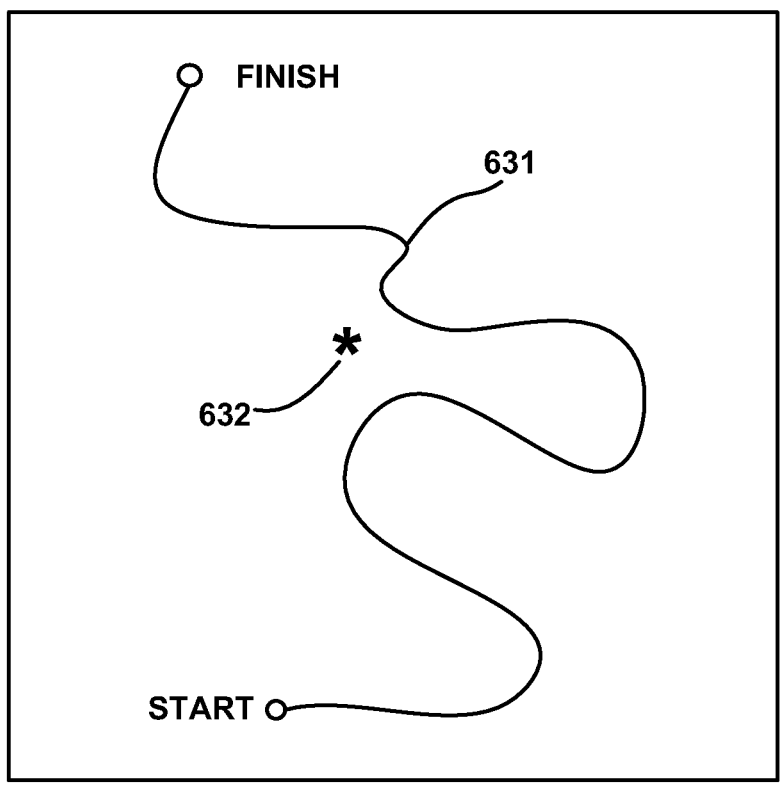
Figure 6D:
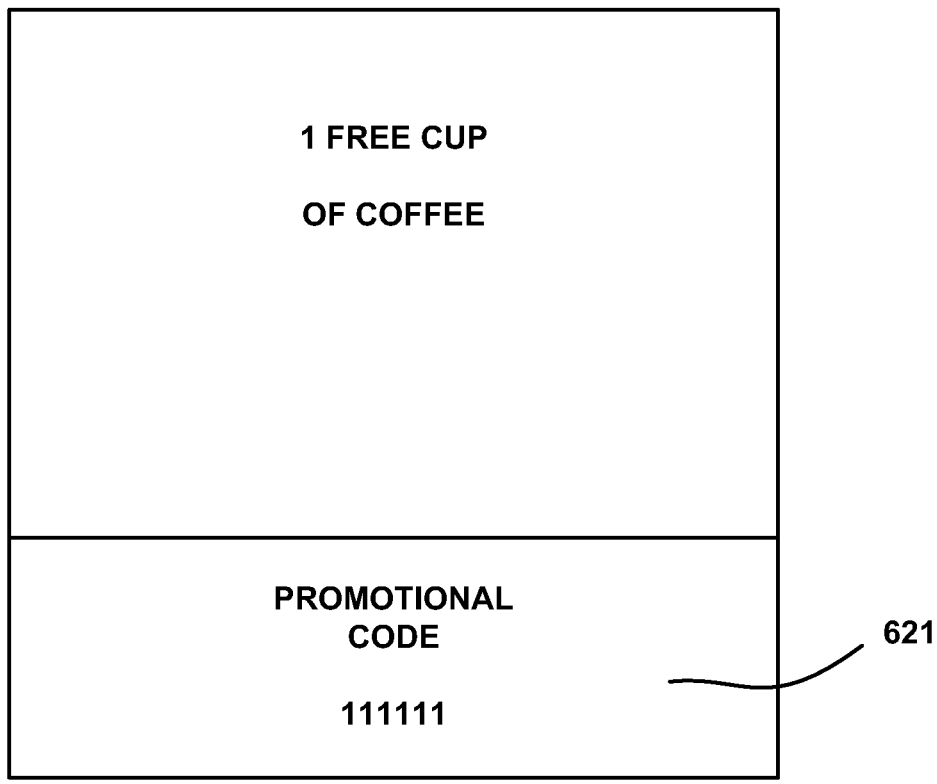

Additionally, targeted content generator 140 can generate an electronic coupon as shown in example screenshot 630 of FIG. 6D. As shown in FIG. 6D, the electronic coupon says that the user of mobile electronic device 110 is entitled to a free cup of coffee. When the user of mobile electronic device 110 goes to the coffee outlet to receive the free cup of coffee, he can simply show the displayed electronic coupon to an employee to get the free cup of coffee. A promotional code 621 can optionally be included in the electronic coupon so that the authenticity of the electronic coupon can be verified.

As described above, increasingly sophisticated software applications are expanding the functionality of handheld electronic devices. Another such software application is the AllSport GPS™ which is commercially available from Trimble® Navigation of Sunnyvale, Calif., 94085. This application allows a user to record, analyze, save, and share data regarding activities such as running, hiking, biking, or the like. In operation, a user selects an activity using mobile electronic device 110 such as running. The user the selects start and begins running. The AllSport GPS software then configures mobile electronic device 110 to record information such as elapsed time, distance ran, what course was taken (including an elevation profile of the course), calories, etc. and records the data. The user of mobile electronic device 110 can then upload that data onto a personal fitness log which is accessible via the Internet.

As it is less likely that a user of mobile electronic device 110 will respond to an instance of targeted content 141 in the middle of a workout, targeted content generator 140 is also configured to deliver targeted content 141 via the Internet. As described above, targeted content generator 140 can utilize a prior geographic position of mobile electronic device 110. For example, targeted content generator 140 can use one of the geographic positions recorded during the course run by the user of mobile electronic device 110 in selecting an instance of targeted content 141. As shown in FIG. 6C, a route 631 run by a user of mobile electronic device 110 is displayed. This is based upon a succession of geographic positions recorded by position determining component 212. Also displayed in screenshot 620 is the geographic position 632 of a subscribed advertiser which was proximate to the course run by the user of mobile electronic device 110. Additionally, the selection of an instance of targeted content 141 may in part depend upon what activity was selected by the user of mobile electronic device 110. Thus, if a user has selected biking as the activity, targeted content generator 140 may emphasize subscribed advertisers related to that activity such as bicycle shops, and de-emphasize other subscribed advertisers such as running shoe retailers.

Figure 6E:
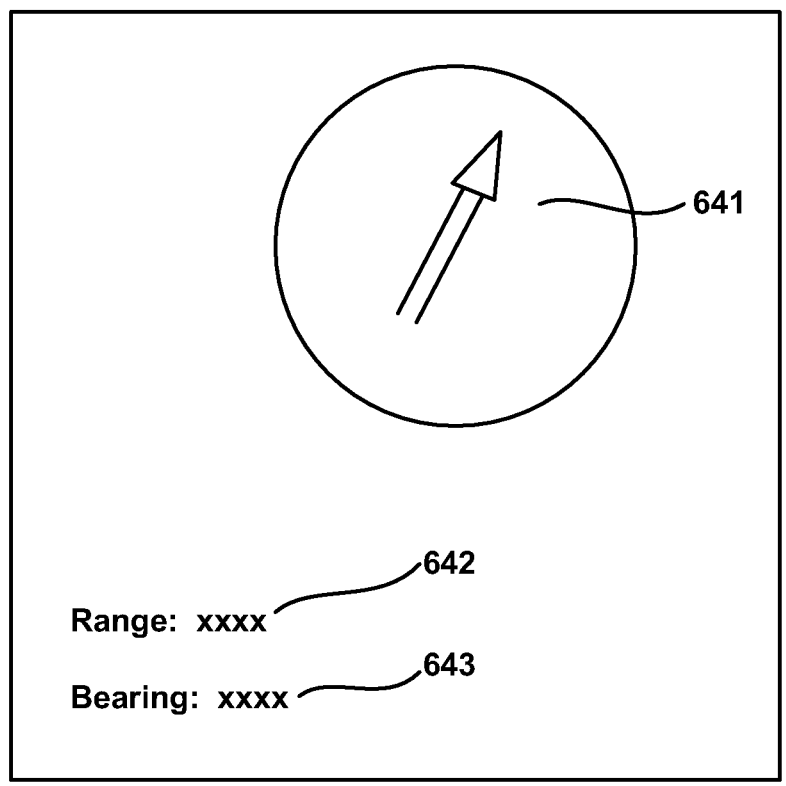

In FIG. 6E, a compass navigation screenshot 640 is displayed which can be displayed by mobile electronic device 110 in one embodiment. In the example of FIG. 6E, screenshot 640 comprises a compass arrow 641 which indicates the direction from the current geographic position of mobile electronic device 110 to a location or outlet of a subscribed advertiser. Also shown in FIG. 6E is a range indicator 642 for displaying the distance from the current geographic position of mobile electronic device 110 to the location or outlet of the subscribed advertiser. FIG. 6E additionally shows a bearing indication 643 for displaying an angular measurement (e.g., a compass azimuth) from the current geographic position of mobile electronic device 110 to the location or outlet of the subscribed advertiser.

Figure 6F:
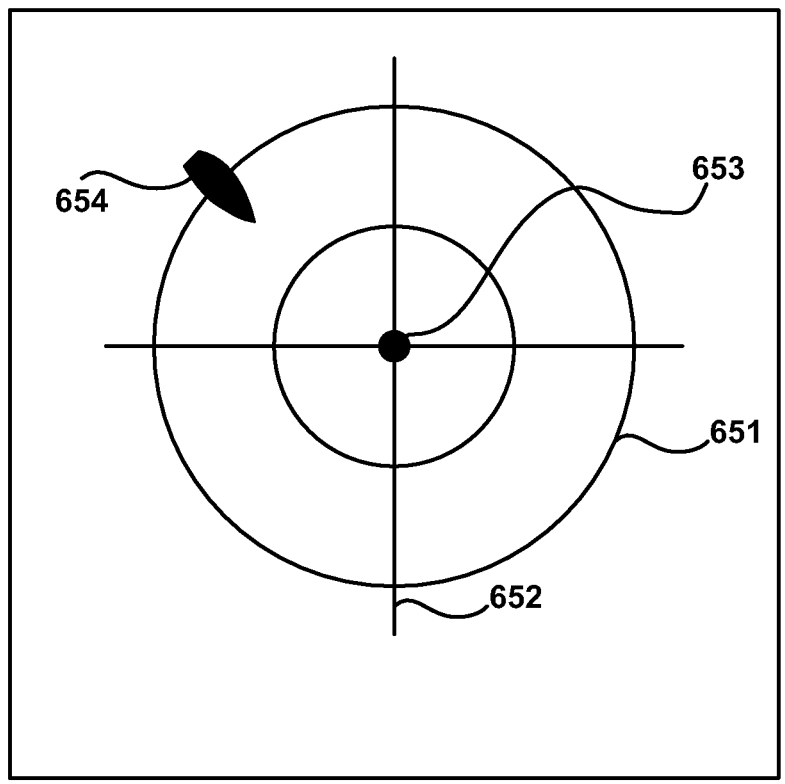

In FIG. 6F, a "radar" screenshot 650 is displayed which can be displayed by mobile electronic device 110 in one embodiment. In screenshot 650 a series of concentric range lines (e.g., 651) and direction lines (e.g., 652) are displayed. In the example of FIG. 6F, the location or outlet (e.g., 653) of the subscribed advertiser is displayed at the center of the display. In other words, the location or outlet of the subscribed advertiser is displayed at the center of concentric range lines 651 and direction lines 652. Also shown in screenshot 650 is the location (e.g., 654) of mobile electronic device 110. In screenshot 650, location 654 is displayed as a triangle having an apex pointed in the direction of location 653. It is noted that range and/or bearing information may also be displayed in one embodiment. In another embodiment, the location 654 of mobile electronic device 110 is displayed at the center of concentric range lines 651 and direction lines 652 while location 653 of the location or outlet of the subscribed advertiser is displayed elsewhere on screenshot 650.

With typical geocaching software currently display information in a manner consistent with screenshots 640 and 650. By displaying the location or outlet of a subscribed advertiser as described above, the user will not detect, or perform, a significant change in their behavior in interacting with mobile electronic device 110.

Figure 5:
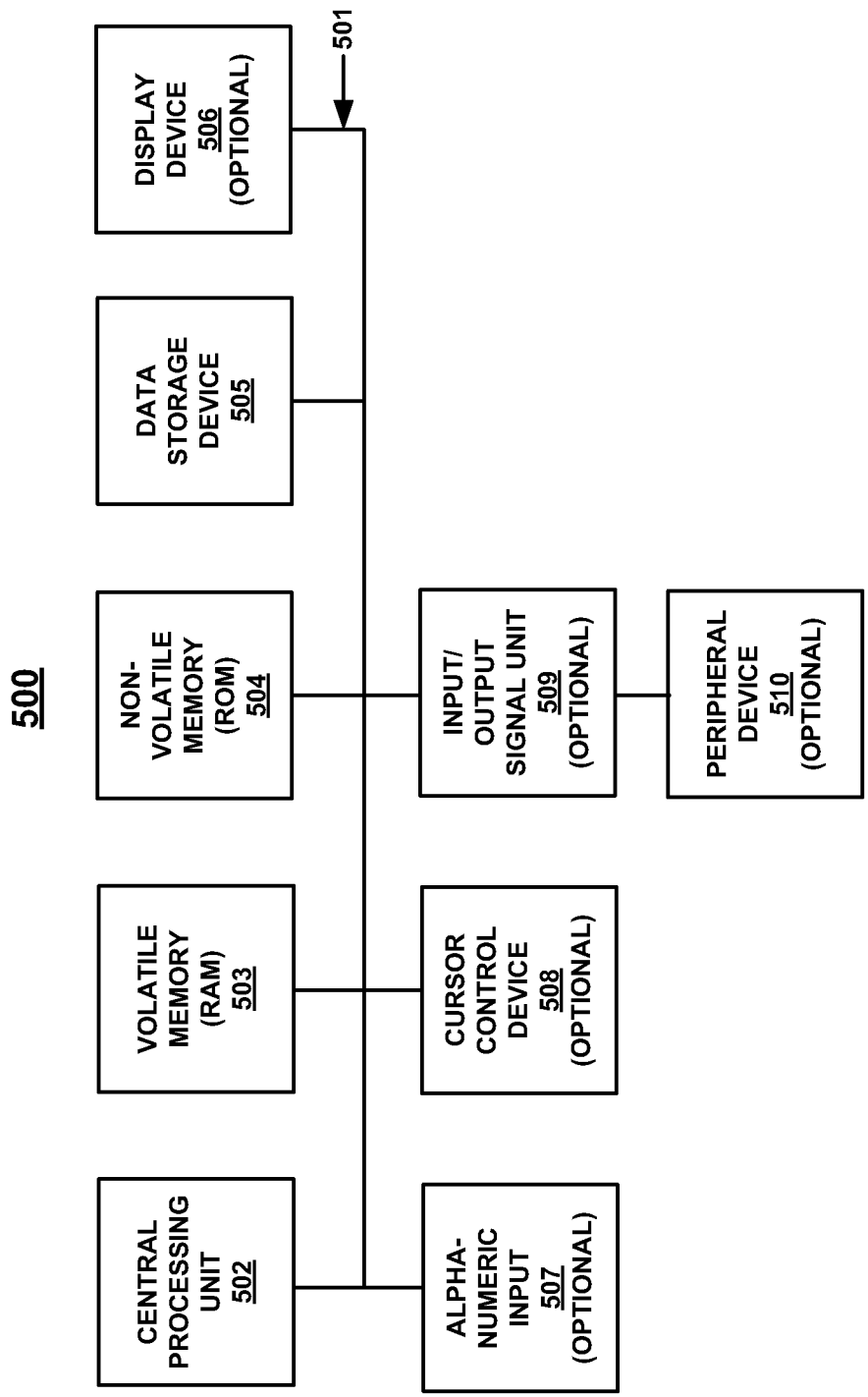
FIG. 5 is a block diagram of a computer system upon which a targeted content generator may be implemented in accordance with one embodiment.

With reference to FIG. 5, portions of the present technology, including targeted content generator 140, are comprised of computer-readable and computer-executable instructions that in one embodiment can reside, for example, in volatile memory 503 of computer system 500 which is used as a part of a general purpose computer network (not shown). It is appreciated that computer system 500 of FIG. 5 is exemplary only and that the present technology can operate within a number of different computer systems including general-purpose computer systems, embedded computer systems, laptop computer systems, hand-held computer systems, and stand-alone computer systems.

In the present embodiment, computer system 500 includes an address/data bus 501 for conveying digital information between the various components, a central processor unit (CPU) 502 for processing the digital information and instructions, a volatile main memory 503 comprised of volatile random access memory (RAM) for storing the digital information and instructions, and a non-volatile read only memory (ROM) 504 for storing information and instructions of a more permanent nature. In addition, computer system 500 may also include a data storage device 505 (e.g., a magnetic, optical, floppy, or tape drive or the like) for storing vast amounts of data. It should be noted that the software program for generating targeted content of the present technology (e.g., targeted content generator 140 of FIG. 1) can be stored either in volatile memory 503, data storage device 505, or in an external storage device (not shown). However, it is noted that targeted content generator 140 can be implemented as dedicated hardware and/or firmware components, or a combination thereof in one embodiment.

Devices which are optionally coupled to computer system 500 include a display device 506 for displaying information to a computer user, an alpha-numeric input device 507 (e.g., a keyboard), and a cursor control device 508 (e.g., mouse, trackball, light pen, etc.) for inputting data, selections, updates, etc. Computer system 500 can also include a mechanism for emitting an audible signal (not shown).

Returning still to FIG. 5, optional display device 506 of FIG. 5 may be a liquid crystal device, cathode ray tube, a touch screen assembly, or other display device suitable for creating graphic images and alpha-numeric characters recognizable to a user. Optional cursor control device 508 allows the computer user to dynamically signal the two dimensional movement of a visible symbol (cursor) on a display screen of display device 506. Many implementations of cursor control device 508 are known in the art including a trackball, mouse, touch pad, joystick, or special keys on alpha-numeric input 507 capable of signaling movement of a given direction or manner displacement. Alternatively, it will be appreciated that a cursor can be directed and/or activated via input from alpha-numeric input 507 using special keys and key sequence commands. Alternatively, the cursor may be directed and/or activated via input from a number of specially adapted cursor directing devices.

Furthermore, computer system 500 can include an input/output (I/O) signal unit (e.g., interface) 509 for interfacing with a peripheral device 510 (e.g., a computer network, modem, mass storage device, etc.). Accordingly, computer system 500 may be coupled in a network, such as a client/server environment, whereby a number of clients (e.g., personal computers, workstations, portable computers, mini-computers, terminals, etc.) are used to run processes for performing desired tasks. In particular, computer system 500 can be coupled in a system for generating targeted content.

FIG. 7 is a flowchart of a method 700 of generating targeted content in accordance with one embodiment of the present technology. In operation 710 of FIG. 7, an indication of the geographic position of a mobile electronic device is received from the mobile electronic device. As described above, mobile electronic device 110 and 300 are configured to determine a geographic position of the device and to send the geographic position to targeted content generator 140.

In operation 720 of FIG. 7, an instance of targeted content is generated based upon the geographic position of the mobile electronic device. As described above, targeted content 141 is selected based upon the proximity of a store, outlet, or other location of a subscribed advertiser to the geographic position of mobile electronic device 110. It is again noted that the geographic position of mobile electronic device 110 may comprise the current geographic position, a previous geographic position, or a predicted geographic position of mobile electronic device 110.

Embodiments of the present technology are thus described. While the present technology has been described in particular embodiments, it should be appreciated that the present technology should not be construed as limited to these embodiments alone, but rather construed according to the following claims.

What is claimed is:

1. A method for generating targeted content, said method comprising:
   receiving from a mobile electronic device, an indication of a geographic position of said mobile electronic device;
   selecting an instance of targeted content using a targeted content generator disposed on said mobile electronic device based upon at least one of said geographic position of said mobile electronic device and a historical record comprising at least one previous geographic position of said mobile electronic device;
   automatically selecting said instance of targeted content based upon a second geographic position of a subscribed advertiser which is proximate to said geographic position of said mobile electronic device; and
   generating said instance of targeted content based upon at least one of said at least one previous geographic position of said mobile electronic device and said geographic position of said mobile electronic device wherein said second geographic position is conveyed in said instance of targeted content, wherein said generating said instance of targeted content does not require user input at said mobile electronic device.

2. The method as recited in claim 1 further comprising:
   utilizing a Global Navigation Satellite System (GNSS) receiver disposed within said mobile electronic device to determine said geographic position of said mobile electronic device.

3. The method as recited in claim 1 further comprising:
   generating a set of instructions for navigating from said geographic position of said mobile electronic device to said second geographic position.

4. The method as recited in claim 3 wherein said mobile electronic device comprises a handheld wireless communication device, said method further comprising:
   automatically generating a message conveying said instance of targeted content to said mobile electronic device.

5. The method as recited in claim 4 wherein said automatically generating said message further comprises:
   conveying an electronic coupon within said message.

6. The method as recited in claim 1 further comprising:
   selecting said instance of targeted content based at least in part upon the current time provided by said mobile electronic device.

7. The method as recited in claim 1 further comprising:
   selecting said instance of targeted content based at least in part upon receiving an indication of a selection of a second instance of targeted content of said subscribed advertiser.

8. The method as recited in claim 1 further comprising:
   selecting said instance of targeted content based upon a predicted geographic position of said mobile electronic device.

9. A computer implemented system for generating targeted content, said system comprising:
   a geographic position indication receiver disposed upon a mobile electronic device configured to receive an indication of a geographic position of said mobile electronic device;
   a targeted content selector disposed upon said mobile electronic device configured to automatically select an instance of targeted content based upon the proximity of a second geographic position of a subscribed advertiser to at least one of a previous geographic position of said mobile electronic device and said geographic position of said mobile electronic device, and to select said instance of targeted content without requiring user input at said mobile electronic device;
   a historical database disposed upon a mobile electronic device configured to store said previous geographic position of said mobile electronic device; and
   a message generator disposed upon said mobile electronic device configured to generate a message conveying said instance of targeted content wherein said second geographic position is conveyed in said instance of targeted content.

10. The computer implemented system of claim 9 further comprising:
    a Global Navigation Satellite System (GNSS) receiver disposed within said mobile electronic device and configured for determining said geographic position of said mobile electronic device.

11. The computer implemented system of claim 10 further comprising:
    a control component resident within said mobile electronic device and configured to automatically generate a message comprising said geographic position of said mobile electronic device.

12. The computer implemented system of claim 9 further comprising:
    a subscribed advertiser database comprising a second geographic position of a subscribed advertiser.

13. The computer implemented system of claim 12 further comprising:
    a subscribed advertiser position reporter disposed upon a mobile electronic device configured to convey said second geographic position in said instance of targeted content.

14. The computer implemented system of claim 13 further comprising:
    a navigation instruction generator disposed upon a mobile electronic device configured to generate a set of instructions for navigating from said geographic position of said mobile electronic device to said second geographic position.

15. The computer implemented system of claim 12 further comprising:
    a time input and wherein said targeted content selector is configured to select said instance of targeted content based at least in part upon the current time provided by said mobile electronic device.

16. The computer implemented system of claim 9 further comprising:
    an electronic coupon selector disposed upon a mobile electronic device configured to append an electronic coupon with said message.

17. The computer implemented system of claim 9 further comprising:
a selection event recorder disposed upon a mobile electronic device for recording a selection of a second instance of targeted content of said subscribed advertiser, and wherein said targeted content selector is configured to select said instance of targeted content based at least in part upon receiving an indication of a selection of said second instance of targeted content of said subscribed advertiser.

18. The computer implemented system of claim 9 further comprising:
a route generator disposed upon a mobile electronic device configured to generate a route from said geographic position of said mobile electronic device and a second location and wherein said targeted content selector is configured to select said instance of targeted content based upon a predicted geographic position along said route.

19. A non-transitory computer-useable storage medium having computer-readable program code stored thereon for causing a computer system to execute a method for generating targeted content, said method comprising:
receiving, an indication of a geographic position of a mobile electronic device;
automatically selecting said instance of targeted content based upon a second geographic position of a subscribed advertiser which is proximate to said geographic position of said mobile electronic device; and
generating said instance of targeted content to said mobile electronic device and wherein said receiving, said selecting, and said generating are performed by said mobile electronic device wherein said second geographic position is conveyed in said instance of targeted content, wherein said generating said instance of targeted content does not require user input at said mobile electronic device.

20. The non-transitory computer-useable storage medium of claim 10 wherein said method further comprises:
utilizing a Global Navigation Satellite System (GNSS) receiver disposed within said mobile electronic device to determine said geographic position of said mobile electronic device and wherein said utilizing is performed by said mobile electronic device.

21. The non-transitory computer-useable storage medium of claim 19 wherein said method further comprises:
generating a set of instructions for navigating from said geographic position of said mobile electronic device to said second geographic position and wherein said generating said set of instructions is performed by said mobile electronic device.

22. The non-transitory computer-useable storage medium of claim 21 wherein said mobile electronic device comprises a handheld wireless communication device, and wherein said method further comprises:
automatically generating a message conveying said instance of targeted content to said mobile electronic device and wherein said automatically generating said message is performed by said mobile electronic device.

23. The non-transitory computer-useable storage medium of claim 22 wherein said automatically generating said message further comprises:
conveying an electronic coupon within said message and wherein said conveying said electronic coupon is performed by said mobile electronic device.

24. The non-transitory computer-useable storage medium of claim 19 wherein said method further comprises:
selecting said instance of targeted content based at least in part upon the current time provided by said mobile electronic device and wherein said selecting is performed by said mobile electronic device.

25. The non-transitory computer-useable storage medium of claim 19 wherein said method further comprises:
selecting said instance of targeted content based at least in part upon receiving an indication of a selection of a second instance of targeted content of said subscribed advertiser and wherein said selecting is performed by said mobile electronic device.

26. The non-transitory computer-useable storage medium of claim 19 wherein said method further comprises:
selecting said instance of targeted content based upon a predicted geographic position of said mobile electronic device and wherein said selecting is performed by said mobile electronic device.

* * * * *